United States Patent [19]
McNeilus et al.

[11] Patent Number: 5,829,946
[45] Date of Patent: *Nov. 3, 1998

[54] DETACHABLE TRUCK BODY AND HANDLING MECHANISM

[75] Inventors: Garwin B. McNeilus, Dodge Center, Minn.; Ronald E. Christenson, Parsons, Tenn.

[73] Assignee: McNeilus Truck and Manufacturing, Inc., Dodge Center, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 844,230

[22] Filed: Apr. 18, 1997

Related U.S. Application Data

[63] Continuation of Ser. No. 377,146, Jan. 24, 1995, abandoned.

[51] Int. Cl.$^6$ .................................................. B60P 1/64
[52] U.S. Cl. ........................ 414/495; 414/498; 410/77; 410/80
[58] Field of Search .................... 410/72, 73, 76, 410/77, 80, 69; 298/22 R; 280/DIG. 8; 296/35.3; 414/498, 495

[56] References Cited

U.S. PATENT DOCUMENTS

| | | | |
|---|---|---|---|
| 1,122,686 | 12/1914 | Clark | 414/498 |
| 1,303,854 | 5/1919 | Clark | 410/80 X |
| 2,150,371 | 3/1939 | Furnish | 410/80 X |
| 2,808,289 | 10/1957 | Scoby | 410/80 X |
| 3,096,894 | 7/1963 | Proler et al. | 414/498 X |
| 3,119,503 | 1/1964 | Herpich et al. | 414/498 X |
| 3,158,106 | 11/1964 | Clejan | 410/80 X |
| 3,255,906 | 6/1966 | Proler et al. | 414/498 X |
| 3,362,552 | 1/1968 | Thiele | 414/498 X |
| 3,370,525 | 2/1968 | Bowles . | |
| 3,399,921 | 9/1968 | Trost et al. | 410/80 X |
| 3,414,147 | 12/1968 | Schroering . | |
| 3,425,576 | 2/1969 | Martin | 414/498 |
| 3,507,410 | 4/1970 | Lieberman et al. . | |
| 3,520,433 | 7/1970 | Blackburn | 414/498 |
| 3,966,096 | 6/1976 | Worthington . | |
| 4,068,769 | 1/1978 | Sweet et al. . | |
| 4,071,274 | 1/1978 | Dalton et al. | 410/69 |
| 4,076,299 | 2/1978 | Dalton | 414/498 X |
| 4,085,857 | 4/1978 | Smith . | |
| 4,102,262 | 7/1978 | Liberman et al. . | |
| 4,108,261 | 8/1978 | Liberman et al. . | |
| 4,116,121 | 9/1978 | Liberman et al. . | |
| 4,125,196 | 11/1978 | Liberman et al. . | |
| 4,163,425 | 8/1979 | Bedard | 410/76 X |
| 4,165,007 | 8/1979 | Brown . | |
| 4,290,726 | 9/1981 | Sutela et al. . | |
| 4,339,148 | 7/1982 | Smith et al. | 410/80 X |
| 4,456,414 | 6/1984 | Williams . | |
| 4,522,550 | 6/1985 | Whitehouse | 414/498 |
| 4,527,939 | 7/1985 | Suarez . | |
| 4,619,578 | 10/1986 | Routledge | 414/495 X |
| 4,750,855 | 6/1988 | Anderson | 414/498 |
| 4,755,098 | 7/1988 | Wulf et al. . | |
| 4,844,672 | 7/1989 | Yurgevich . | |
| 4,954,040 | 9/1990 | Smith et al. . | |
| 4,992,014 | 2/1991 | Bock . | |
| 5,072,845 | 12/1991 | Grogan . | |
| 5,078,560 | 1/1992 | Patrick et al. . | |
| 5,085,554 | 2/1992 | Kirchhoff et al. . | |
| 5,106,247 | 4/1992 | Hove et al. . | |
| 5,108,247 | 4/1992 | Vlaanderen . | |
| 5,131,673 | 7/1992 | Gleeson et al. | 280/DIG. 8 X |
| 5,143,496 | 9/1992 | Smith et al. . | |

FOREIGN PATENT DOCUMENTS

| | | | |
|---|---|---|---|
| 4103255A | 8/1992 | Germany | 410/80 |
| WO9421540 | 9/1994 | WIPO . | |

*Primary Examiner*—Stephen T. Gordon
*Attorney, Agent, or Firm*—Haugen and Nikoiai, P.A.

[57] ABSTRACT

A container handling apparatus for receiving, engaging and releasing exchangeable chassis mounted containers, which may be truck bodies, or the like, capable of readily locking and unlocking a truck body to a supporting chassis is disclosed that is self-contained on the chassis. A truck body or container which may be self-supporting is also disclosed.

17 Claims, 16 Drawing Sheets

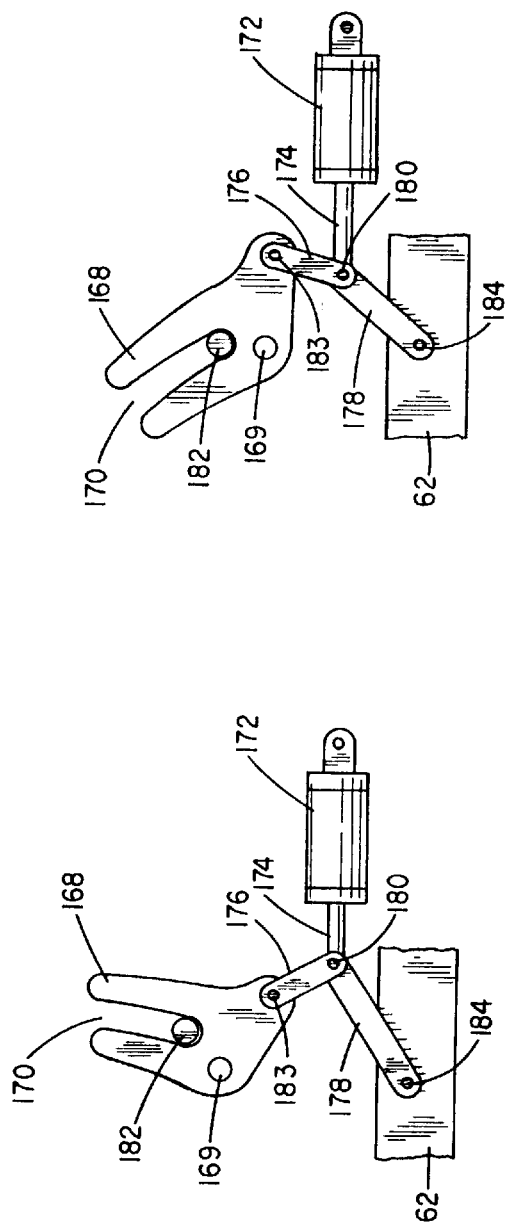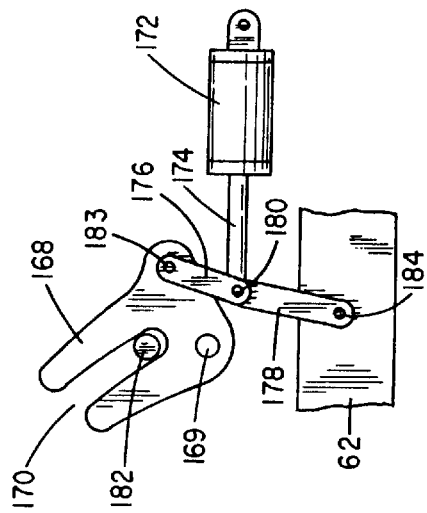
FIG. 6a
FIG. 6b
FIG. 6c

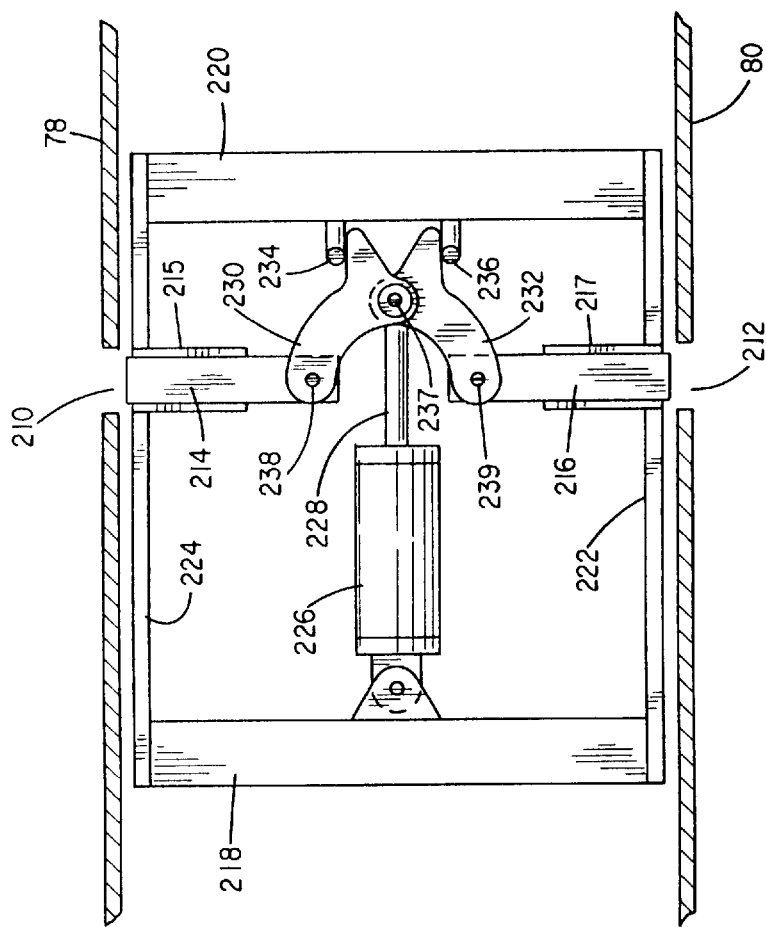

DETACHABLE TRUCK BODY AND HANDLING MECHANISM

This is a continuation of application Ser. No. 08/377,146, filed on Jan. 24, 1995, now abandoned.

BACKGROUND OF THE INVENTION

I. Field of the Invention

The present invention is directed generally to an automated system for rapidly exchanging chassis-mounted truck bodies or modular containers and, more particularly, the invention involves a self-contained system integral with and operable using power from the truck chassis itself, the system being capable of interfacing with self-supporting or unsupported body modules.

II. Description of the Related Art

Truck-type vehicles generally include a heavily constructed structural chassis frame which provides the cab and the truck body support structure and includes the engine, drive train and associated hydraulic systems and/or other power take-off mechanisms. The chassis are generally combined with a permanently mounted single-function body. Thus, a chassis designed to support a permanently attached delivery box, dump body or other special-function device such as a refuse compaction body is limited to that function once assembled. Even where the single function is all that is desired, such as with the collection and transport of refuse, much of the working time of the vehicle is spent traveling to and from landfills to empty full containers.

Common types of refuse trucks include front-end loading and side loading embodiments in which the refuse is compacted rearward and removed and discharged through a rear access. The front-end loading version is particularly adapted to pick-up and dump large commercial refuse containers or storage bins in which the filled container is addressed at the front of the truck, picked up by a pair of side mounted lifting arms and fork arms which engage the container to raise it above the storage body of the refuse truck and invert it to dump its contents into a top opening in a truck body just behind the cab. The sequence is then reversed and the empty refuse container is returned to the ground. The material received from the storage container is then compacted through the rearward movement of a compaction panel within the storage body. In the receiving position, the compaction panel is positioned forward of the top opening and after the refuse is received in the body, the panel is advanced rearward to propel and compact the refuse into a rear storage section and against a heavy tailgate which is hinged to the storage body to close a rear discharge opening. After the rearward movement of the compaction panel to pack the refuse, the panel is again moved forward and positioned to address and compact new refuse.

In this manner, the rear portion of the storage container eventually becomes completely filled with compacted refuse. At this point, the truck containing the filled refuse container must be driven to a landfill or other point of discharge which may be many miles away to be unloaded before it can be returned to service to pick up additional refuse. The time required for driving to and from the loading and the unloading site, of course, is wasted or "down" time with respect to collecting refuse.

The refuse truck represents or illustrates one type of specialty-use vehicle which could be utilized much more efficiently and effectively were the time directed to transporting and unloading the refuse reduced during collection hours. If the traditional dedicated permanently fixed refuse receiving and compacting truck body could be replaced by an easily exchangeable truck body temporarily connected to the truck chassis for refuse collection such that each filled container could be disconnected quickly, left at a convenient location and replaced by an empty container, the truck could be kept in service virtually the entire usable refuse collecting time and the efficiency of the collection operation could be greatly enhanced.

Methods and devices have been proposed for interchanging various truck body configurations on a single chassis. In this manner, it has been suggested, for example, to exchange such diverse configurations as a dump body, tank body and stake body on a single chassis to transform a single-use vehicle to a multi-use device. Devices designed to allow quick release coupling of interchangeable bodies which may be the same body design include devices such as that illustrated and described by Williams in U.S. Pat. No. 4,456,414, which uses a system in which a plurality of interlocking hooks and tabs provided on a chassis and the truck body are engaged by moving the truck body horizontally along on the chassis using external means. A latch pin, or the like, prevents dislodgement of the body from the chassis once in place. While this system does provide for a quick-releasable positive hold-down for the truck body, no mechanized means are provided on the truck itself to accomplish the latching and unlatching, which must depend on means external to the truck.

Other devices include latching and unlatching using tilt mechanisms and other systems which require the truck to be addressed by large external devices to move the vehicle body relative to the chassis. None of the prior devices provides a simple chassis-mounted, self-contained automated system capable of exchanging truck bodies on a chassis.

It therefore is an object of the present invention to provide a chassis-mounted, self-contained container handling apparatus for receiving, engaging and releasing containers which may be truck bodies, or the like, capable of locking and unlocking a container to a supporting chassis.

It is a further object of the present invention to provide a container handling apparatus for locking and releasing containers which is quick and automated in operation.

A still further object of the present invention is the provision of a container handling apparatus for removing, engaging and releasing containers which is completely contained on the vehicle chassis.

Another object of the invention is to provide a container to be secured to a chassis.

Yet another object of the invention is to provide a self-supporting truck body capable of being rapidly interchanged on a truck chassis.

SUMMARY OF THE INVENTION

The present invention provides an autonomous, automated vehicle mounted container handling system for rapidly exchanging, i.e., receiving, engaging, locking and separating replaceable modular containers, which may be task-specific truck bodies, such as refuse hauling receptacles, on a supporting truck chassis. The apparatus is designed to be a stock assembly integral with the truck chassis such that all mechanized elements are powered from and carried on the truck chassis. In this manner, location guiding, locking, unlocking and separation devices may be conveniently contained on the chassis.

Several container handling embodiments are contemplated. According to one embodiment of the invention, a main container grabbing and locking mechanism includes one or more rotating eccentric cam latches associated with one or more transverse horizontal axles supported by longitudinal chassis frame members. Each eccentric cam has an open latching slot or recess designed to capture a corresponding latch bar means fixed to the container. Cam rotation not only secures each nested latching bar into the corresponding slot but also shifts the bar or bars horizontally to propel the container into a locked position. In another embodiment, a protuberance on the bottom of the container or truck body engages an opening in an horizontally movable plate which is operated by a fluid cylinder to move the container in and out of a locked position. A positive mechanical locking means may be provided to lock each cam or operating fluid cylinder in the securing position to prevent unwanted dislodgement of the container during use as by loss of fluid pressure.

Container locking systems that may be employed include interlocking mating "hook" devices which latch and unlatch based on horizontal travel of the container relative to the chassis to secure or lock the container to the chassis in accordance with horizontal container displacement inherent in the operation of the eccentric cam system or moving plate system. In the locked position, pairs of side mounted interlocking elements or hook devices fully engage to provide a positive hold down or lock between the container or truck body and the chassis. Reversed operation of the eccentric cam means or cylinder/plate system, of course, produces reverse displacement of the container or truck body thereby disengaging the pairs of side mounted interlocking elements and thereafter allows disengagement and normally generally upwardly directed separation of the container.

Lifting and support devices provide temporary transfer support for the container or truck body to facilitate an exchange clear of mechanisms and other chassis parts. One embodiment includes pairs of aligned, oppositely disposed, spaced fluid-operated cylinders, attached to the sides of the chassis and designed to operate vertically against plates or brackets fixed to the body such that extension of the cylinders provides four-point lifting support. In another embodiment, spaced, chassis-mounted, fluid cylinder operated pivoting lifting arms having convex-shaped upward directed portions are employed instead of the vertical cylinders to operate in conjunction with matching concave upper container-mounted lift brackets to provide a self-aligning lift system that keys the container/chassis into the proper orientation. The pistons of the piston-cylinder lifting elements or lifting arms extend so that the bottom of the container or truck body, once raised, vertically clears chassis parts and mechanisms that could interfere with removal.

The container or truck body may be provided with independent means of support deployable with the truck body or container in the lifted position. For example, pivotal or telescoping legs attached thereto, optionally with feet, may be deployed on either side of the container allowing the lifting elements to be retracted leaving the container independently supported and enabling the chassis to move away from under the container.

An unloaded chassis can readily be maneuvered into position with respect to a free standing empty container which can then be quickly connected to the chassis by reversing the steps of the disconnecting sequence. Guide means such as flared gussets or self-aligning brackets may be provided on the chassis of the truck or container (truck body) for facilitating the alignment of the truck body with the chassis when the replacement body is in position for attachment to the truck chassis.

In this manner, a filled refuse body, for example, can be dropped at a convenient location and later reloaded onto the same or possibly a different chassis for removal to a remote landfill, or other place of load disposal, or loaded onto a different type of vehicle, possibly one designed for carrying a plurality of such containers to be emptied. A separate trailer may be also provided to transport a second replaceable truck body behind the mounted one. Also, a dumping arrangement may be provided to tilt truck bodies at the landfill for emptying.

The invention also contemplates the independent exchangeable container or truck body itself, which may or may not have independent means of support but which, in any event, are separate exchangeable modules and which may be designed for receiving and discharging compacted refuse, for example.

BRIEF DESCRIPTION OF THE DRAWINGS

In the drawings, wherein like reference numerals refer to like parts throughout the same:

FIGS. 6a–6c illustrate a type of over center locking linkage mechanism suitable for locking rotating cams as shown in FIGS. 4a–4c and 5a and 5b;

FIGS. 9a and 9b are plan views, partially in section, depicting an alternative locking mechanism shown in the locked and unlocked positions respectively;

DETAILED DESCRIPTION

It will be appreciated that the vehicle mounted container handling apparatus of the invention represents a system that can be entirely self-contained with respect to a vehicle chassis. Thus, the entire exchange operation including receiving, engaging, locking and releasing of containers such as truck bodies or the like, can be accomplished utilizing the invention in conjunction with self-supporting containers or truck bodies without the need for any external means. It is further contemplated that the invention has broad application and will readily adapt to a variety of chassis/truck body or container applications. While the detailed description contained herein is particularly directed to refuse vehicles of rearward compacting types, this is meant purely by way of example and not limitation.

Figure 1:
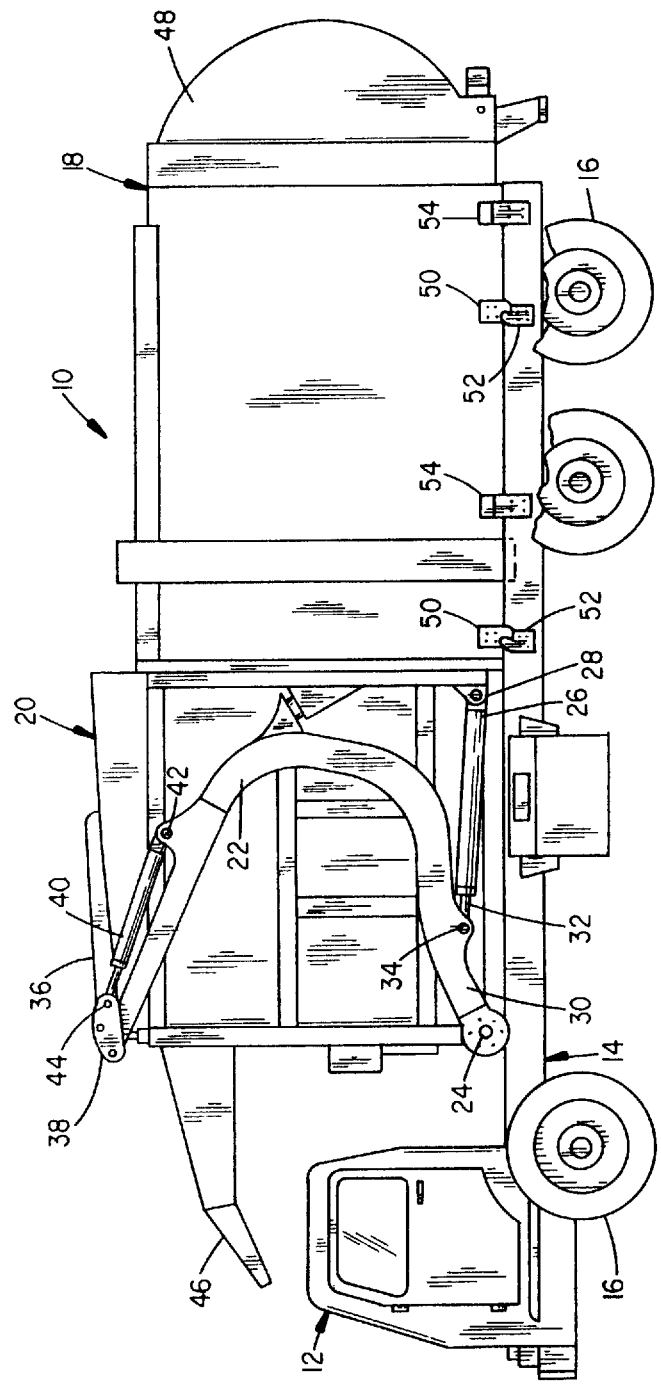
FIG. 1 is a representation, with parts broken away, of a side view of a front-end loading refuse truck with a removable refuse body fully locked to the chassis.
Figure 2:
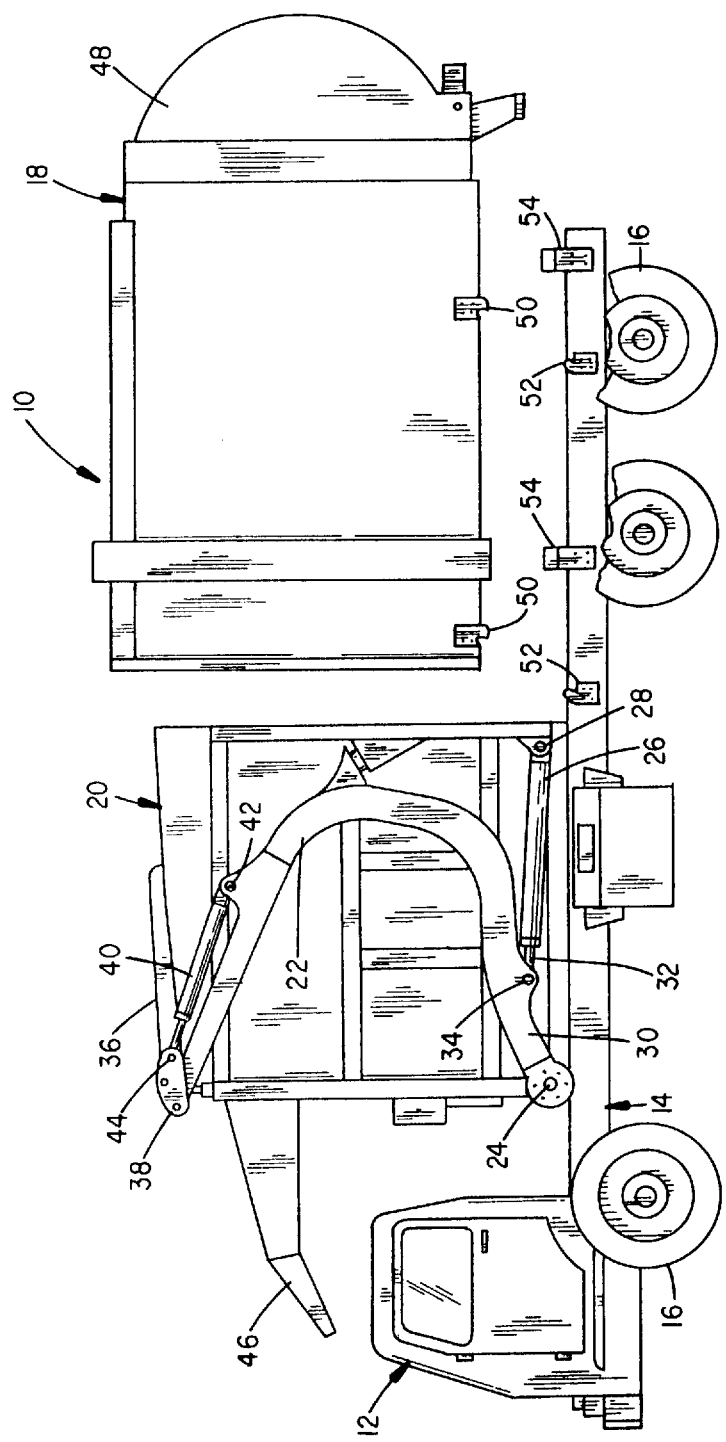
FIG. 2 is similar to FIG. 1 with the removable refuse body separated from the chassis.

In accordance with describing certain preferred and illustrative embodiments of the present invention, reference is made to the accompanying drawings and, initially, with particular reference to FIGS. 1 and 2 thereof. FIG. 1 illustrates a front-end loading rearward compacting refuse vehicle 10 which includes a cab section 12 mounted on a chassis 14 supported by a plurality of wheels 16. The vehicle includes a modular refuse storage container 18 mounted behind a receiving/compacting section 20. In this embodiment, the receiving/compacting section 20 including an hydraulic compacting system is permanently mounted on the vehicle chassis 14. The exchangeable refuse container or exchangeable truck body is the modular refuse storage container 18.

A pair of lifting arms, one of which is shown at 22, may be mounted on the forward section of the truck body 20 or on the chassis 14 using pivotal mountings 24. Hydraulic cylinders 26 supported through pivotal clevis mountings as at 28 are connected to lever arm portions 30 of the lifting arms 22 through piston rods 32 with pivotal mountings 34. As can be seen from the illustration, the cylinder 26 is fully contracted and the system is in its fully retracted position. Expansion of the cylinders 26, and thereby extending rods 32, causes the lift arms 22 to move forward, and deploy for picking up a full container or setting down an empty container.

The outer ends of the lift arms 22 are provided with fork arms 36 connected by pivotal mountings 38 with the fork arms 36 being rotatable with respect to the lifting arms 22 to the expansion or contraction of a pair of hydraulic cylinders 40 secured to the lifting arms through pivotal mountings 42, 44. Operation is pivotal as the fork arms 36 together with the lifting arms 22 cooperate in a well-known manner to engage, lift and invert a refuse container to be dumped into the hold of the refuse receiving section 20. A protective hood 46 is positioned to protect the top of the cab from any hazards associated with lifting and dumping containers.

Figure 3:
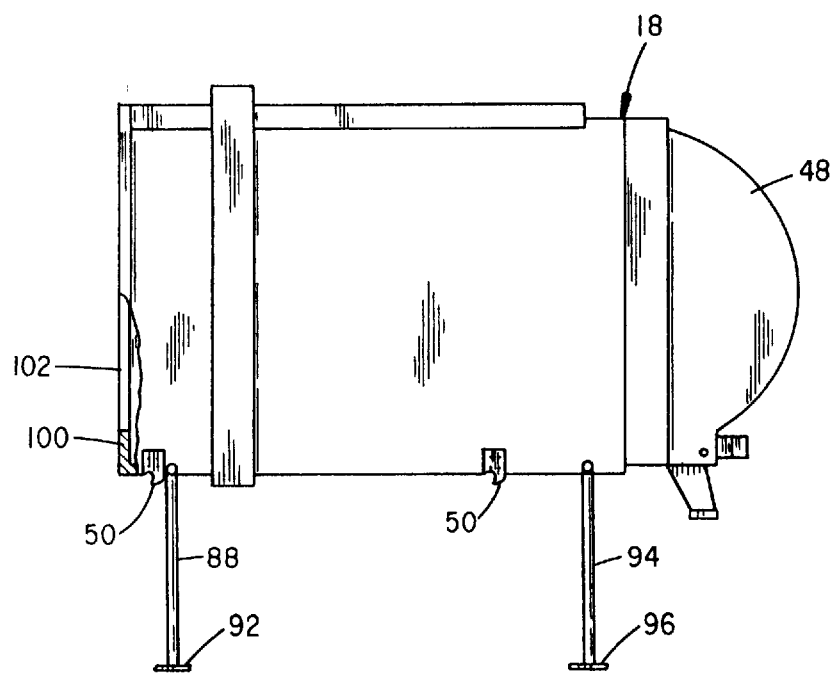
FIG. 3 is a side view depicting the refuse body of FIGS. 1 and 2 as self-supporting.

Within the truck body, the refuse receiving section 20 further contains a mechanical compacting system in which a vertically disposed sweep blade (not shown) engages and pushes the material in the permanent receiving section 20 rearward into the exchangeable storage container 18 in a conventional and well-known manner. As can be seen in FIG. 3, the central portion of the front of the container or refuse body 18 is open to receive refuse being compacted in the rearward direction. The container further includes a conventional vertically pivoted hinged discharge door 48 designed to withstand the extreme forces associated with repeated rearward hydraulic compression of the refuse in the removable body 18.

In accordance with the latching system of the invention, the removable refuse body 18 further includes pairs of spaced locking means 50, preferably horizontally engaging hook means, designed to interlock with matching hook means 52 fixed to the chassis 14. The system is shown in the fully engaged or locked position in FIG. 1. In FIG. 2, the detachable refuse body has been displaced horizontally (rearward) and vertically and is shown in the fully raised detached position with the pairs of interlocking hooks 50 and 52 as disengaged and separated.

A schematic representation of details of the container handling mechanism illustrated in FIGS. 1 an 2 are better shown in FIGS. 4a–4c, 5a and 5b, 6a–6c, and 7–11. In FIG. 5a, a chassis frame is depicted that includes a pair of main longitudinal structural channels 60 and 62 spaced laterally by transverse members as at 64. A further transverse member 66, which may be a rod or axle-type member, carries a single eccentric cam member 68 with open slot 70 journalled thereon for rotation about the member 66. The cam is operated by a double acting fluid-operated cylinder 72 with piston 74. Further pairs of cylinders, a member of one pair being shown at 76, with vertically adjustable pistons 77, are provided in oppositely disposed aligned spaced relation and fixed to chassis members 60 and 62.

The minor fractional section of the removable container or truck body section 18 depicted in the exploded view of FIG. 5a includes spaced parallel lower longitudinal structural frame members 78 and 80 spanned by a transverse or cross-latching member 82 which may be a bar. Lifting gusset members as at 84 are provided arranged in oppositely disposed aligned pairs, disposed to align with the pistons 77 when the container is in the unlatched receive/release position.

The removable container 18, when free of the chassis, may be supported independently from pairs of deployable supports, one of which includes legs 86 and 88 with attached feet 90 and 92, respectively. A second pair of support members including leg 94 with foot 96 are shown in FIG. 3, which further depicts a truck body in the independent self-supported mode. In the broken segment, the front panel 100 is shown as ending at 102, the front portion 102 being open for the reception and compaction of refuse.

Figure 5A:
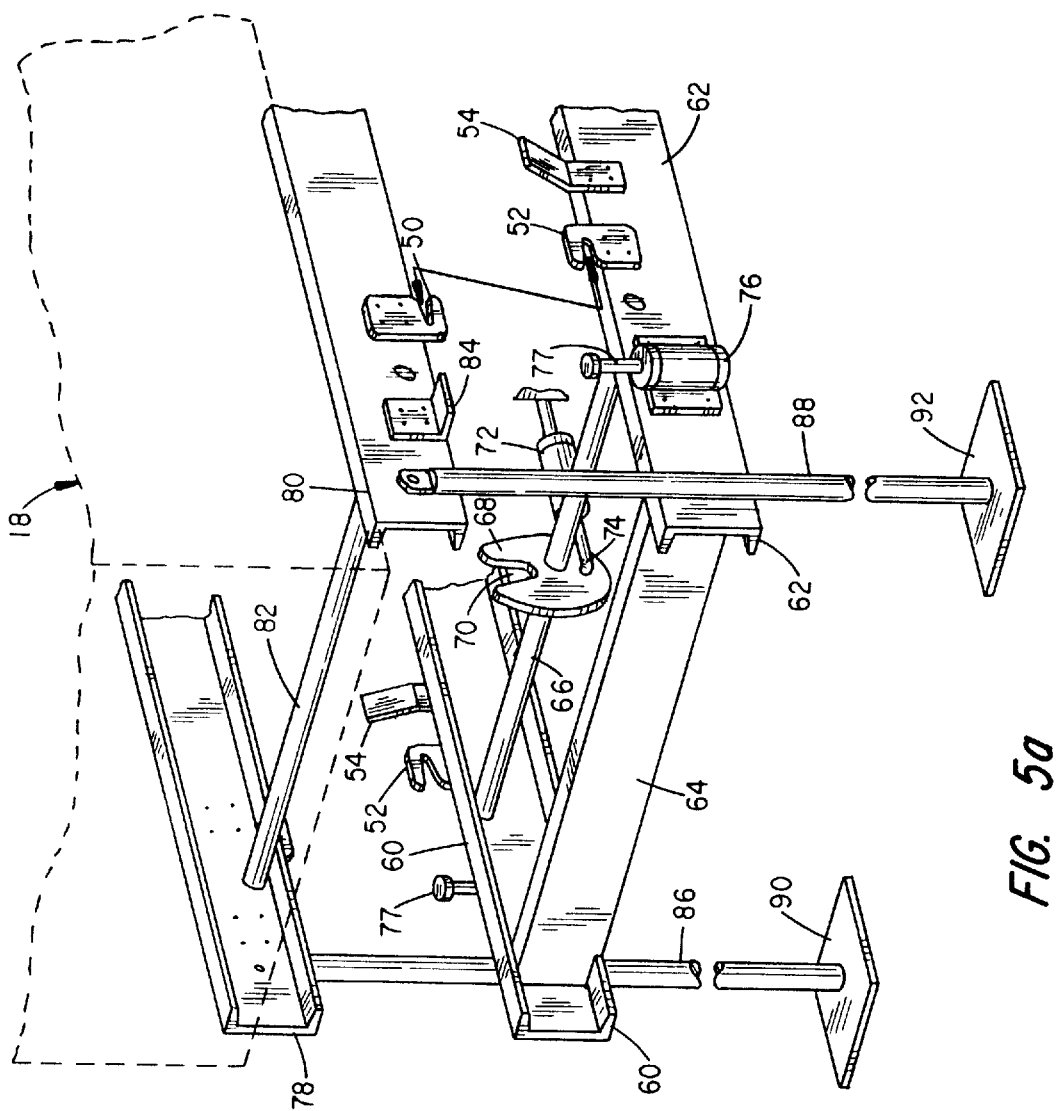
FIGS. 5a and 5b are fragmentary, exploded, perspective views showing exemplary alternative embodiments of an eccentric cam latching/locking and a separate and independent support and lift mechanism in accordance with the invention.
Figure 5B:
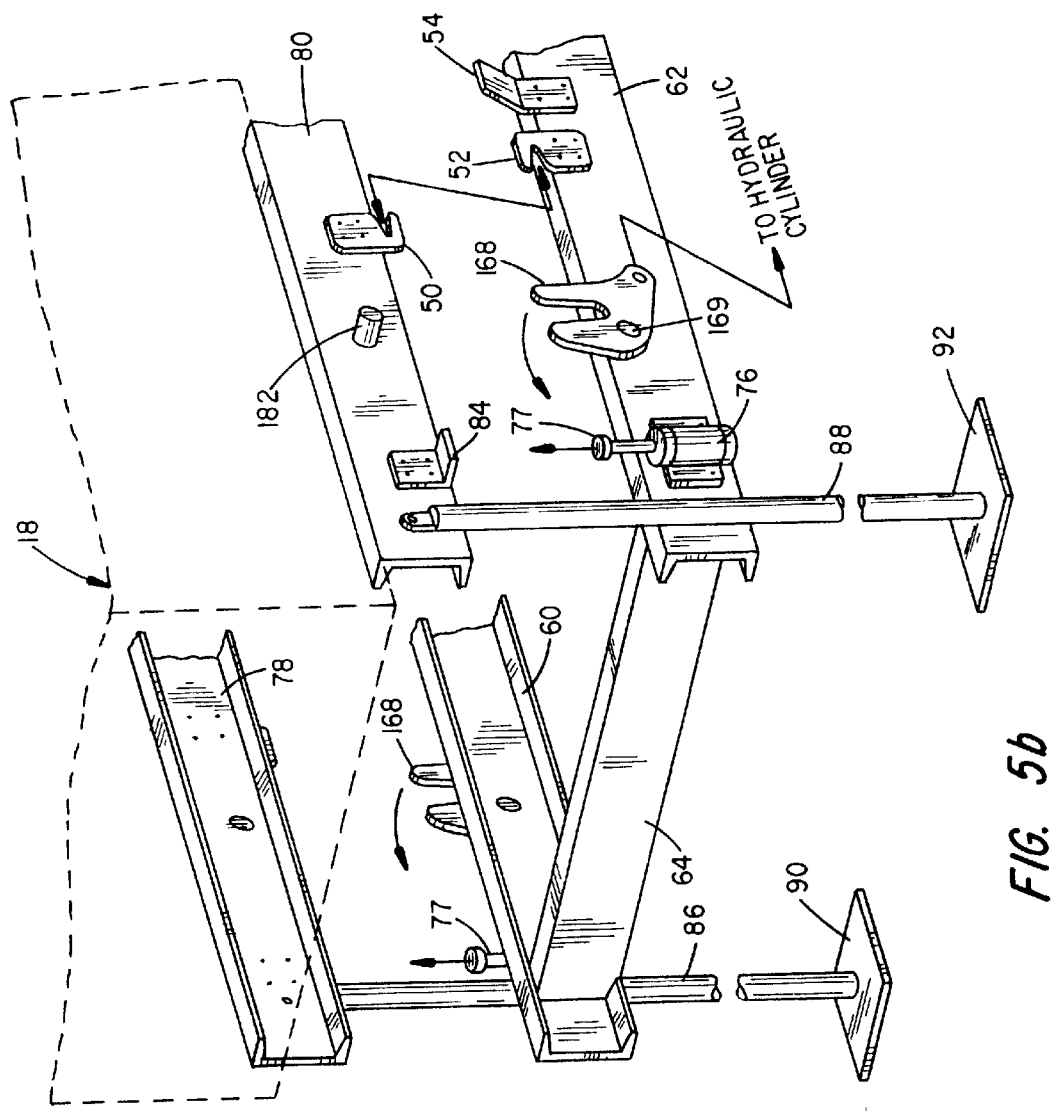

FIG. 5b depicts an alternative cam arrangement for the chassis/container system of FIG. 5a utilizing a plurality of oppositely disposed spaced cam members 168, which are designed to operate rotating about or with a mounting shaft 169 in the manner of cam 68 as previously described. Stub latching bar members as at 182 may be used instead of continuous bar as at 82. The exact number and location of the cams, locking means 50/52 and support piston-cylinders 76/77 or equivalent mechanical means for receiving, engaging and locking, and releasing the containers in accordance with the preset invention may vary according to the design and application.

A locking device may be provided to prevent untimely rotation of any of cam members 68, 168 should the pressure be lost in the fluid operated cylinders 72, 172, etc. FIGS. 6a–6c illustrate one possible locking device of a type commonly referred to as an over-center linkage that can be used with the cams. While universally applicable, it is illustrated particularly with regard to cams 168. Each rotating cam 168 having slot 170 is connected to piston rod 174 of double-acting cylinder 172 via a linkage including arm members 176 and 178, in which one end of each pivotally connect together and to the piston 174 as at 180, the free end of member 176 further being pivotally connected to the cam 168 at 183 and the free end of member 178 pivotally fixed to the truck chassis as at 184.

The cam linkage operates between a straight (locked) and a folded configuration, as shown, but is capable of bending only in one direction. FIG. 6a shows the system with the slot 170 substantially in the engage/release position with the piston rod 174 substantially in the retracted position and the linkage folded. In FIG. 6*b*, the piston is partially extended and the slot 170 has engaged the bar 182 and moved part way toward the locking position. The view 6*c* shows the linkage in the aligned, fully locked, position, the cylinder being fully extended. In this position, the corresponding hooks 50/52 are fully engaged and vertical movement of the container is precluded. Only horizontal displacement will disengage the hooks. It should be noted that even should the cylinder 172 lose pressure, any force tending to horizontally displace the container in a manner to disengage the hooks would tend to rotate the cam 168 to the right and this will be opposed by the locked linkage.

Figure 4A:
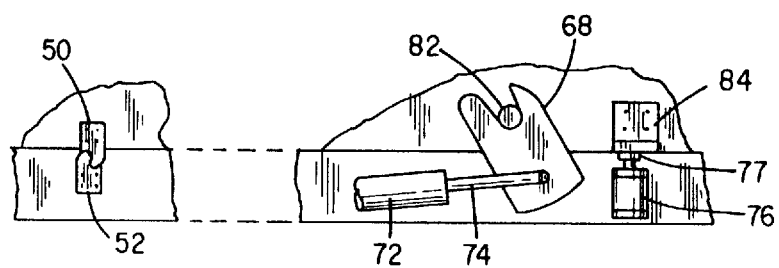
FIGS. 4a–4c represent fragmentary details of a possible eccentric cam of latching/locking mechanism, respectively, in the locked, unlocked and unlocked/separately supported position.
Figure 4B:
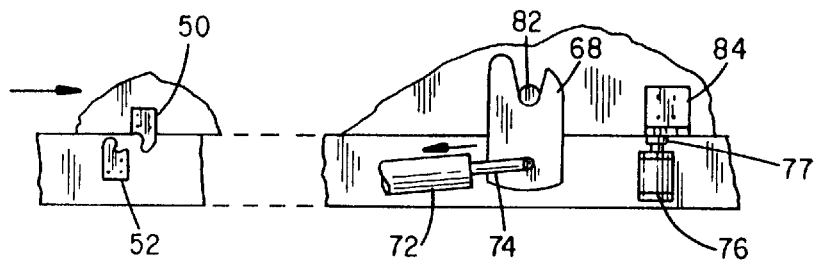
Figure 4C:
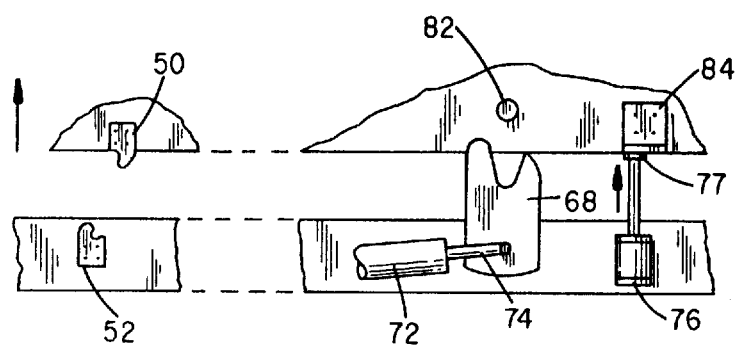

FIGS. 4*a*–4*c* are simplified schematic representations of the operation of the container handling system in accordance with one embodiment of the invention. The cylinder 72 is shown on the reverse side of cam member 68 for reasons of illustrative convenience. The operating sequence, assuming an "empty" chassis, will next be described.

Figure 8:
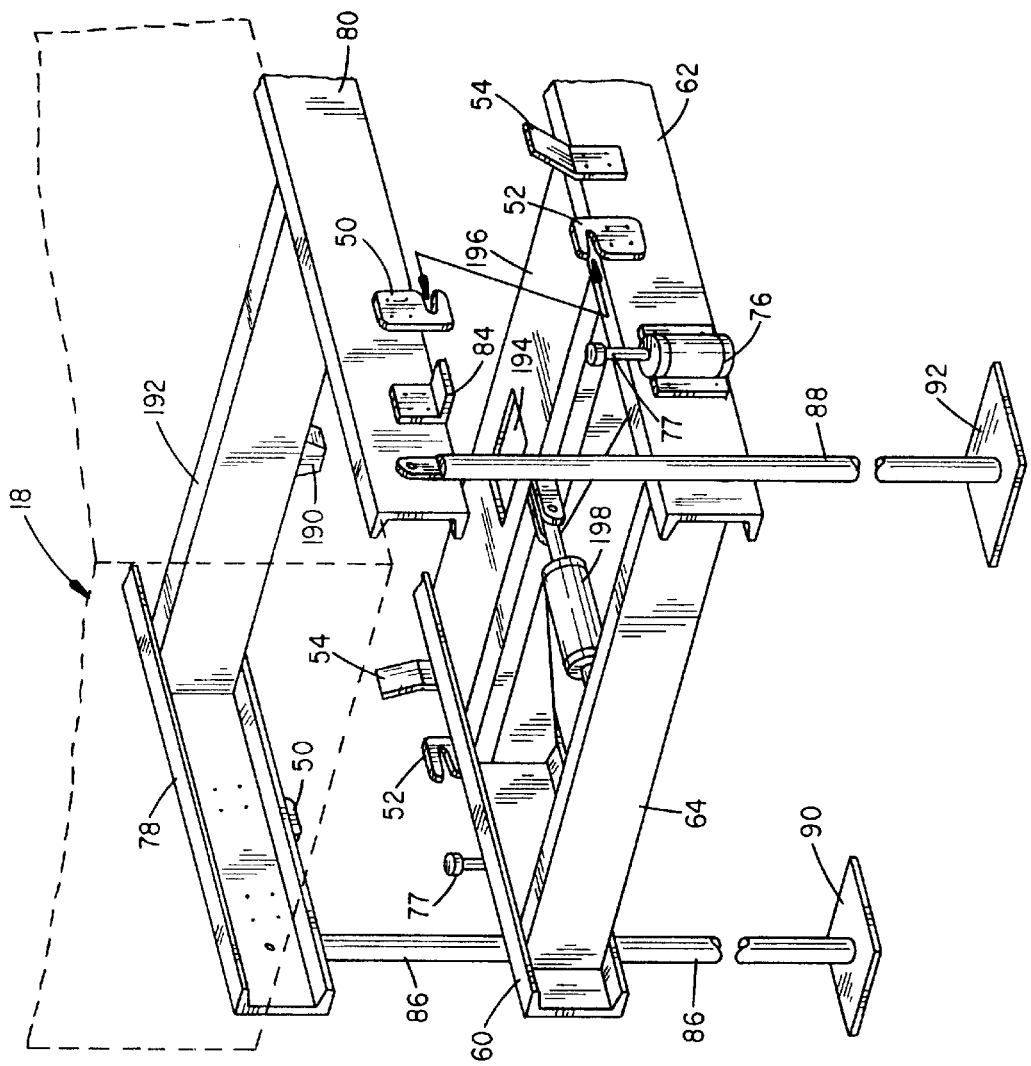
FIG. 8 is a fragmentary, exploded, perspective view showing another guiding and locking mechanism in accordance with the invention.

FIG. 8 depicts an alternative to the cam arrangement for the chassis/container system of FIGS. 5*a* and 5*b* in the form of a spur or tongue and plate latch arrangement. A wedge-shaped tongue member 190 carried by a rigid structural transverse member 192 spanning the longitudinal members 78 and 80 on the removable container or truck body 18 is designed to be received and aligned within a corresponding opening 194 in an horizontally disposed transverse heavy metal plate or channel 196. The member 196 is slidably mounted between the flanges of the longitudinal chassis members or chassis rail members 60 and 62 operable by one or more double-acting fluid cylinders as at 198. The opening or hole 194 in the member 196 is advantageously somewhat larger in size than the spur or tongue member 190 to allow or compensate for positional variations or minor misalignments which may occur between the chassis and the container or body to be received. Once the truck body is lowered into place, the slidable member 196 moves fore and aft to shift the removable body on the truck chassis guided by the chassis rails, as shown, or alternatively by a subframe above the truck chassis (not shown) to engage and disengage the hooks 50/52.

Figure 7:
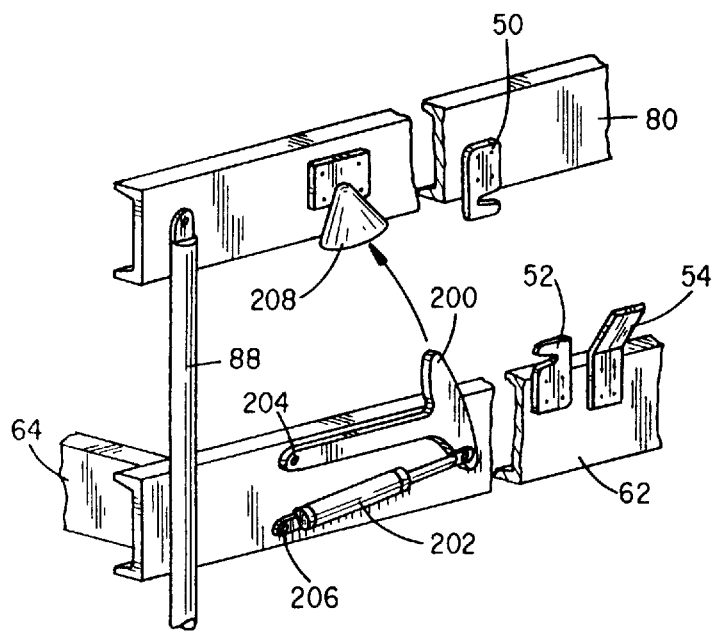
FIG. 7 is a further fragmentary, exploded, perspective view showing an alternate lift and aligning mechanism.

FIG. 7 depicts an alternative truck body or container lifting mechanism employing a pivoting lifting arm 200 manipulated by a fluid-operated lifting cylinder 202. Both the lifting arm and the lifting cylinder are pivotally mounted as at 204 and 206, respectively. The lifting arm 200 is provided with a self-aligning generally upwardly directed pointed end which is adapted to engage a corresponding concave self-aligning upper bracket 208 attached to the structural member 80 of the container or truck body. This embodiment of the lifting mechanism has the advantage that when it lifts a truck body or container that is being supported on its own legs, for example, the body will key into the proper orientation both side to side and fore to aft relating to the chassis. Of course, the body and chassis must be in the acceptable range or related position such that the member 200 will enter the bracket 208 so that when the truck body is then lowered, it will key into the lifting arm. This arrangement further reduces possible side forces exerted on the lifting cylinders of the type in FIGS. 5*a* and 5*b* produced by a slightly misaligned chassis or container. This embodiment further eliminates the need for the guide members 54 in addition to the lifting cylinders and gussets or brackets shown in FIGS. 5*a* and 5*b*. Of course, the mechanism of FIG. 7 can be used with any of the body positioning and locking devices such as the rotating cam system and the spur and plate system utilizing the side latching and locking hooks 50 and 52 or the latch pin system (FIGS. 9*a* and 9*b*) discussed next below.

Figure 9A:
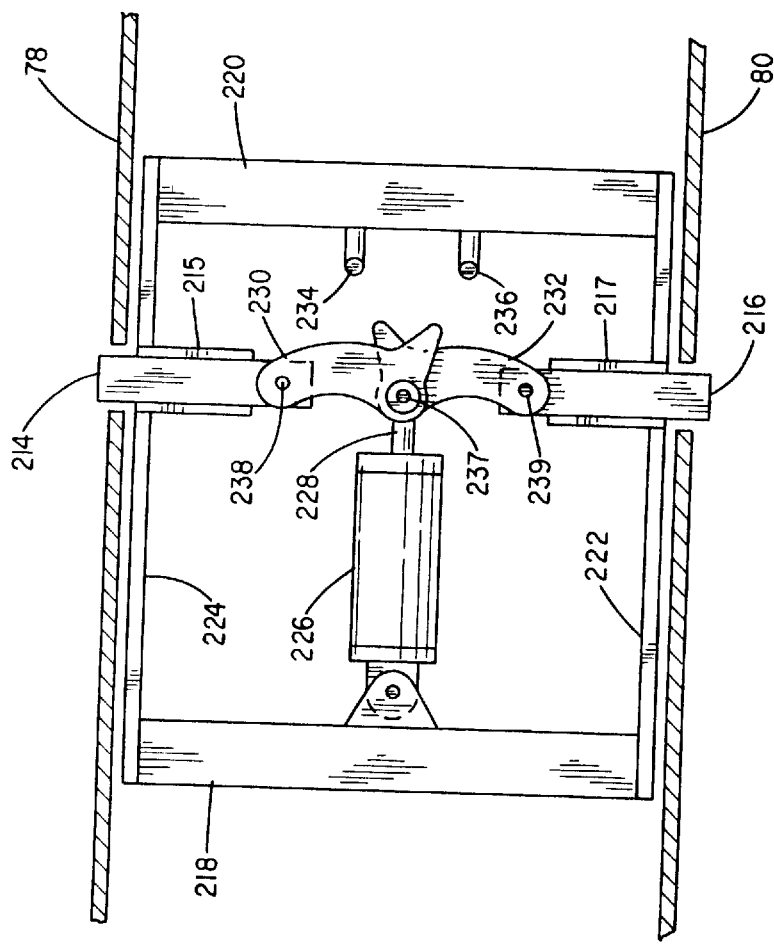

An alternative locking system is depicted in FIGS. 9*a* and 9*b* in which FIG. 9*a* depicts the chassis/truck body system in the locked position and FIG. 9*b*, in the unlocked position. This system includes locking openings in removable body longitudinal frame members 78 and 80 which are designed to accommodate large latch pins 214 and 216 which ride in guide tubes 215 and 217, respectively, which, in turn, are carried by a subframe fastened to the chassis frame and including a pair of parallel transverse members 218 and 220 spaced by parallel longitudinal members 222 and 224. The transverse structural member 218 carries and supports a double-acting, fluid-operated cylinder 226 which, in turn, with rod 228, operates a pair of centrally-connected, pivotally mounted connecting links 230,232 which cooperate in a scissor linkage in conjunction with a pair of guide rods 234 and 236 to extend and withdraw the latch pins 214 and 216 along guide tubes 215 and 217. In the fully unlocked position, the projections of the connecting links 230 and 232 are nested between the guide rods 234 and 236 and the piston 228 of the cylinder 226 is fully extended. When the body locking mechanism is actuated to lock a body or container on the chassis, the cylinder 226 is actuated to withdraw the piston 228. The projections on the connecting links act to center the latch pin system so that both latch pins withdraw or extend the same distance. As the rod 228 is withdrawn, the pivot point 237 is advanced toward the cylinder 226. As shown in FIG. 9*a*, when the locking pins 214 and 216 are in the fully extended position extending through the openings 210 and 212 fully locking the chassis and body together, the pivot point 237 has been withdrawn to a point beyond the center line between the pivotal connections 238, 239 between the locking pins and the connecting links so that the pivot point 237 itself is in an over-center locked position such that thereafter inward forces acting on the locking pins 214, 216 will not cause the cylinder to extend to an unlocked position.

Figure 10:
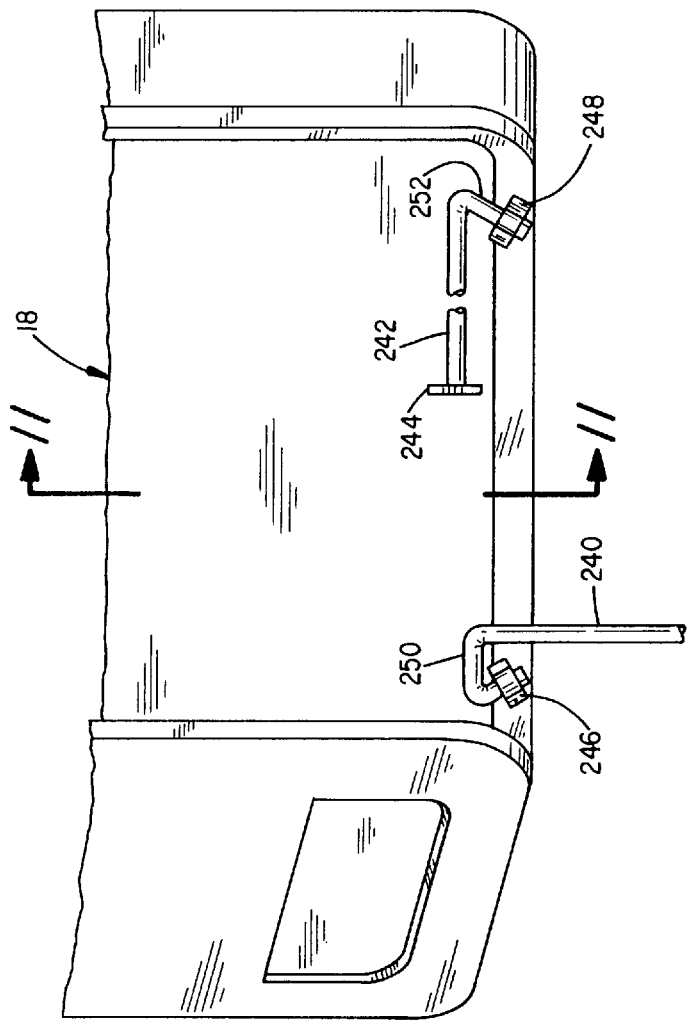
FIGS. 10 and 11 are fragmentary views depicting the deployment of pivoting support legs in accordance with one embodiment of the invention.
Figure 11:
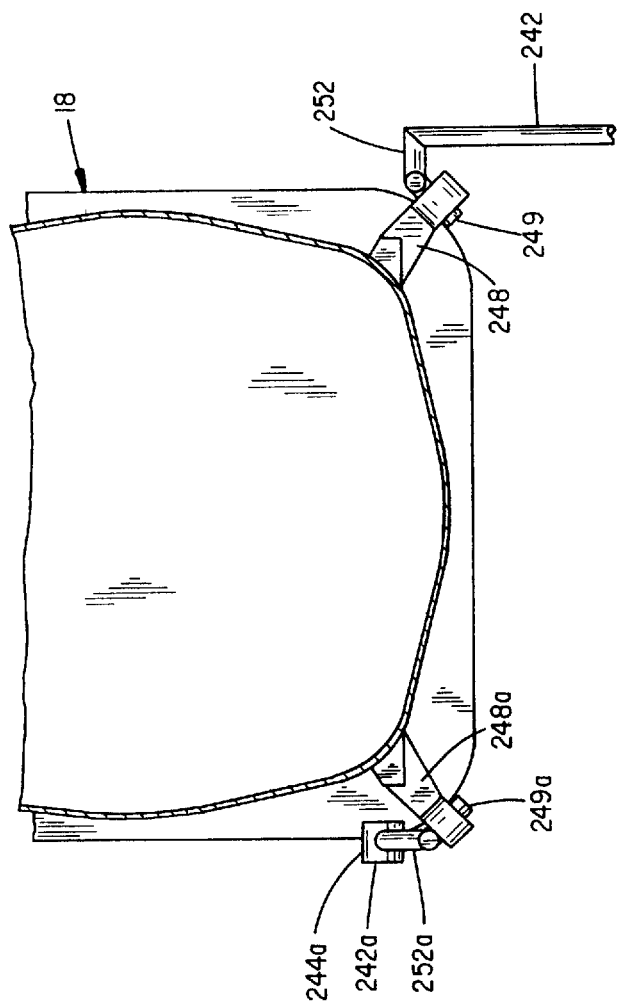

FIGS. 10 and 11 depict views of one system for deploying the support legs for the truck body or container in accordance with the invention. In this manner, a front leg 240 shown broken and a back leg 242 with foot 244 are shown as pivotal about inclined pivot housing tubes 246 and 248, respectively, which may be 45° or other convenient angle. Both pivot tubes have an inward and downward inclination and feature a bottom end 249 rotatable on an inclined axis. Each support leg is provided with an offset segment as at 250, 252 between the leg axis and the pivot axis so that the legs will store close to the body 18 but extend in a manner which allows them to laterally or transversely clear the truck chassis as best shown in the fractional end view of FIG. 11. This allows for easy deployment and retraction. The leg opposite 242 is depicted as 242*a* with foot 244*a* and inclined pivot mounting bracket 248*a* and rotating member 249*a*. This allows for easy pivoting for both deployment and stowing of the truck body support legs in accordance with the invention.

Figure 12:
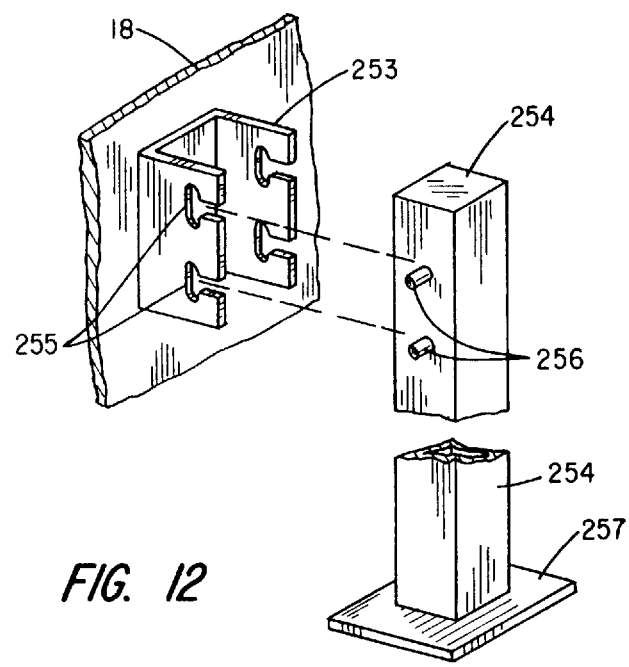
FIGS. 12 and 13 are fragmentary views illustrating a system of detachable support legs.
Figure 13:
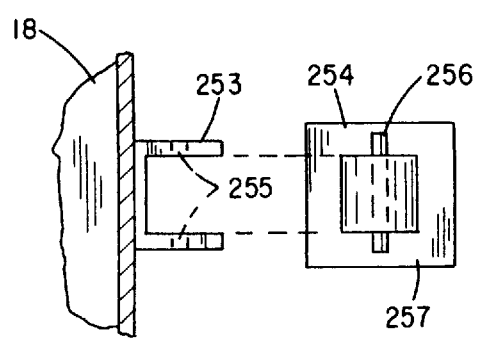

FIGS. 12 and 13 depict the use of detaching support legs 254 with feet 257 which support the truck body by means of fixed support brackets 253 with shaped openings 255 and associated leg support pins 256. The legs are simply attached or detached by hand when the body is in a raised supported position. The shape of the openings 255 retains the pins in place when weight is applied.

To load a truck body, the chassis is first positioned underneath a body to be attached, typically one self-supported as shown in FIG. 3. In this position, and with respect to the embodiment of FIGS. 5a and 5b, the truck body is aligned using guides 54 and positioned so that lift pistons 77 are aligned vertically with lifting gusset members 84. The pistons 77 are extended in unison to engage the gusset members 84 and lift the body off of the leg supports which can then be retracted or swiveled out of the way in a well-known manner. The truck body is then carried by the extended pistons 77 above the chassis of the truck.

Utilizing the single or multiple rotating eccentric cam locking system, with the slot of the cam, or plurality slots and cams, as the case may be, e.g., slot 70 of cam 68 in the vertical receive/release position (FIGS. 4b, 5), the pistons 76 are then retracted lowering the container body onto the chassis, the latch bar or transverse member 82 received in the slot 70.

Of course, the system depicted in FIG. 7 can be used in the alternative, and is more readily adaptable to slight misalignment of the chassis and the body to be loaded and locked on the chassis. Using this arrangement, the chassis is positioned underneath the truck body or container to be secured such that the self-aligning upper brackets 208 are positioned above the pivotal position of the lifting arms 200. The lifting arms 200 are then raised and the self-aligning conical shape of the upper brackets will cause the truck body to key into the proper orientation, assuming that the chassis is aligned close enough so the lift arms will engage the conical brackets. Using the lifting arms, the body is then lifted off of the support legs and they may be withdrawn or pivoted to a stowed position. The lifting arms can then be lowered and the truck body to be fitted onto the chassis will automatically self-align to the proper position on the chassis for locking.

The system is provided with any necessary appropriate interlocks so that the system functions as desired. For example, each cam as at 68, 168 must be in the proper receive/release position prior to the lowering or raising the truck body using the vertical piston/cylinder or lifting arm arrangements. In this position, the hook means 50, 52 are aligned in relation to slidably engage but are still separated (FIG. 4b). The piston 74 is then used to rotate cam to the latched or locked position (FIG. 4a) thereby positively latching the member 82 in the slot 70 preventing horizontal displacement of the member 82. As the cam member 68 rotates from the open or receive/release position of FIG. 4b to the latched position of FIG. 4a, the member 82 and so the entire truck body 18 is displaced an amount horizontally with respect to the chassis. This horizontal displacement causes the engagement or interlocking of the members 50 on the body with the members 52 on the chassis thereby securing the truck body to the chassis. A locking device such as the over-center locking linkage (FIGS. 6a–6c) prevents undesired displacement of the container relative to the chassis during use.

If the spur or wedge and plate system be employed for moving the truck body relative to the chassis in order that it be locked in place, any of the raising and lowering systems may be employed along with the interlocking hook locking mechanism or, in the alternative, a system such as the extending latch pin system of FIGS. 9a and 9b. In this regard, it will be appreciated that any of the locking mechanisms can be associated with any of the truck body or container lifting mechanisms and that each incorporates a means to displace the truck body or container along the chassis to accomplish locking, either automatically or by separate means such as aligning openings with latch pins.

The truck body is released by simply reversing the steps used to secure the body to the chassis. As with the rotating eccentric cam systems, the other loading and unloading mechanisms for the containers or truck bodies are also provided with any necessary interlocks to prevent events from happening in an improper sequence.

Figure 14:
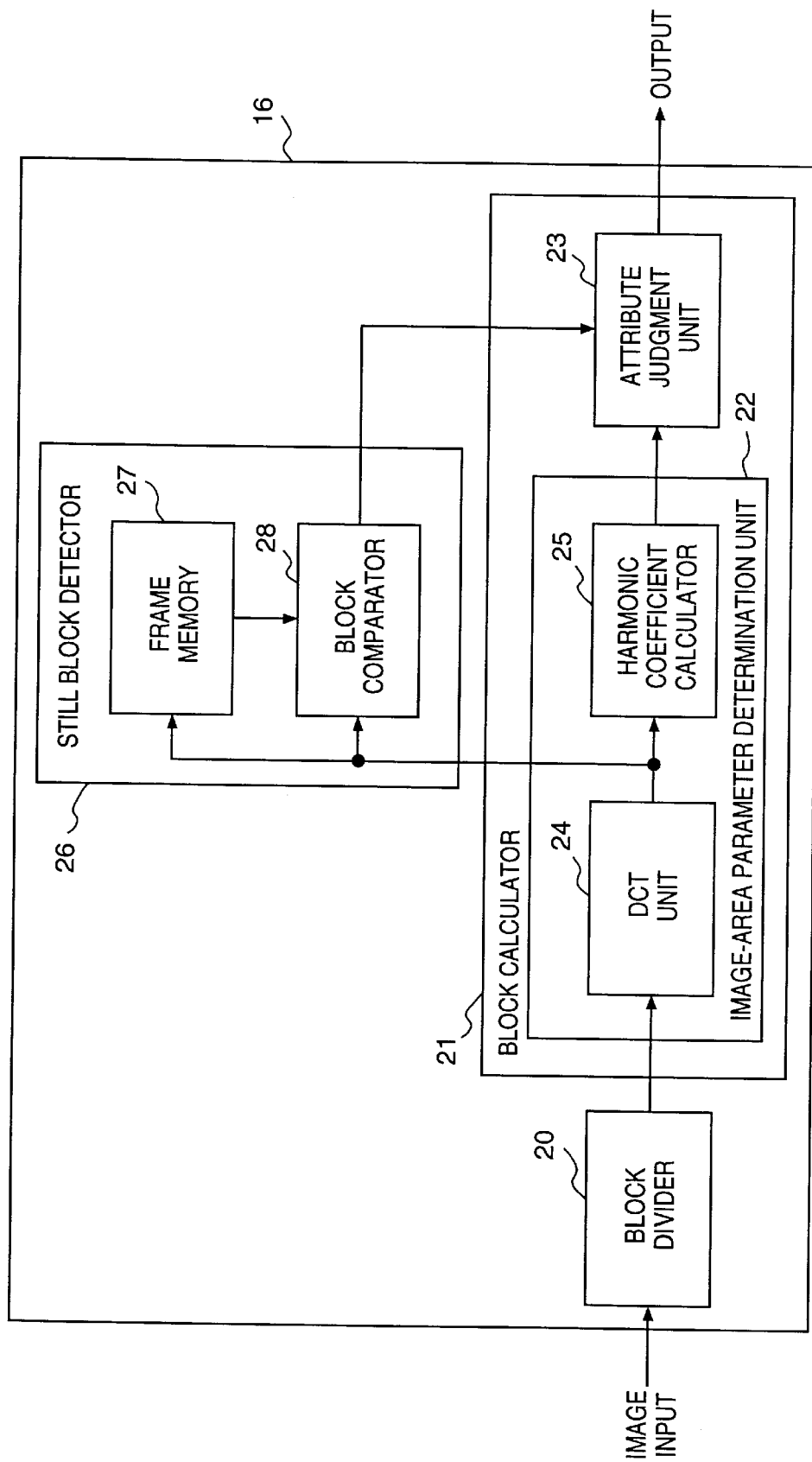
FIG. 14 represents an alternate embodiment to the refuse truck of FIGS. 1 and 2 including a trailer carrying a second exchangeable truck body.

FIG. 14 depicts the truck assembly associated with FIGS. 1 and 2 but including an additional container or body 18 fixed in a similar manner to a trailer chassis 260 commonly referred to as a "four wheeler" carried by wheels 262 and connected by a spaced trailer hitching frame arrangement 264. Electrical, hydraulic and/or pneumatic connections are made between the main chassis and the trailer chassis via a connector 266 in a well-known manner. The mechanism for loading and unloading the container or truck body 18 from the trailer chassis 260 may be identical to those discussed with regard to the main truck chassis. They may readily be exchanged. Once the truck body originally placed on the truck chassis 18 is full, both bodies can be removed, each from the respective carrying chassis, and the empty one then remounted on the truck chassis and the full one, or yet another empty one mounted on the trailer chassis so that the vehicle can fill at least two truck body containers prior to any need for going to a landfill.

Figure 15:
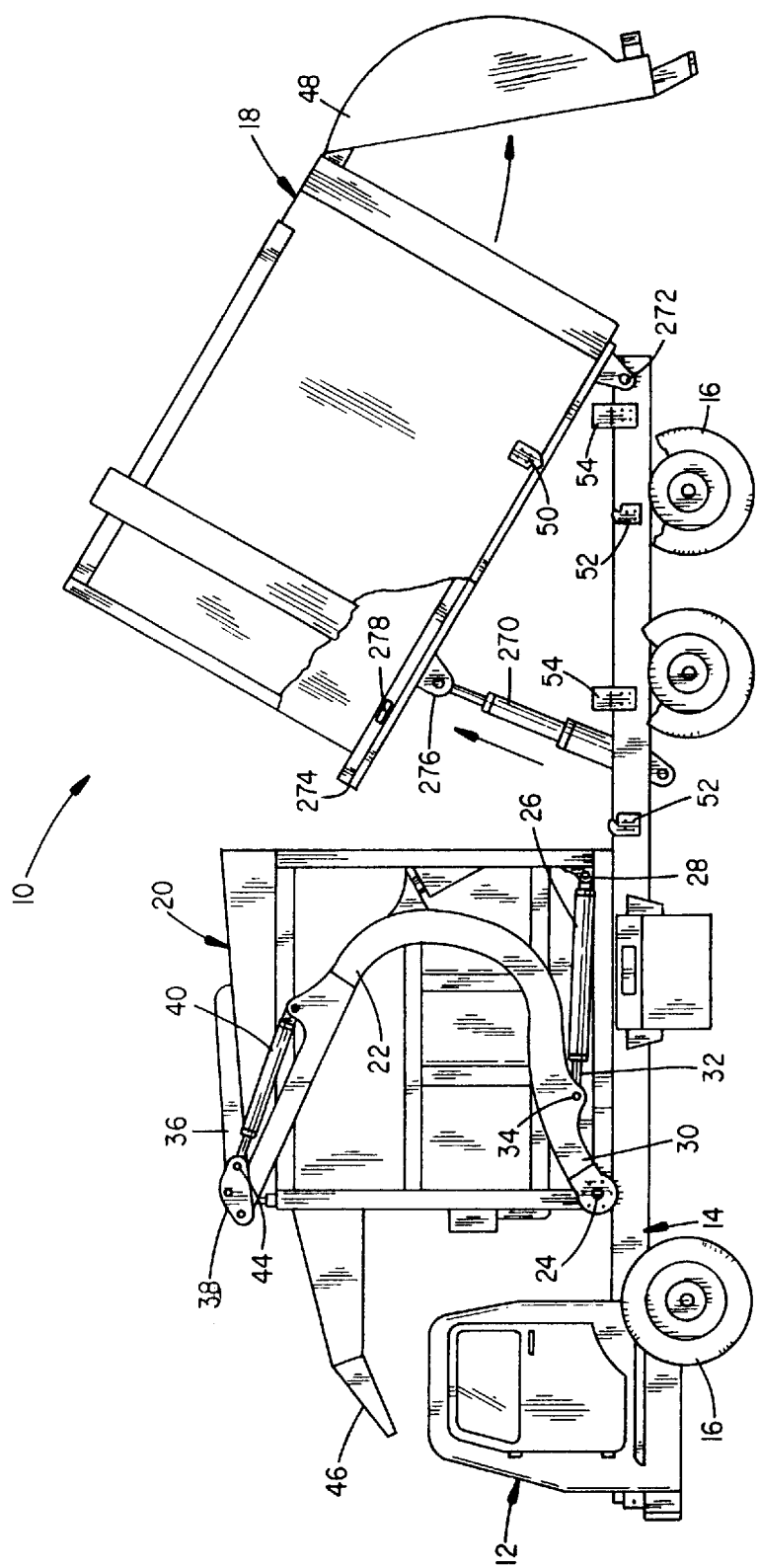
FIG. 15 presents yet another embodiment employing a tilt-up system for emptying an exchangeable truck body in accordance with the invention.

FIG. 15 depicts yet another mechanism for handling any of the embodiments using the container or truck bodies 18 which includes a telescoping pivoting or dump cylinder mechanism 270 pivotally attached at 276 which can be used to tilt a truck body once it has been detached from the interlocking hooks or latch pins, or other locking device, but secured to tilt frame 274 as by protruding pins 278 so that it may be directly emptied by pivoting up from the truck chassis. This represents an additional optional mechanism which can be used with any of the raising, lowering and latching mechanisms described. For the purposes of tilt-up, the truck body will be as provided with pivot members as at 272 which ride in grooves in the chassis and are utilized only for tilting the truck body to discharge accumulated materials. Once returned to a substantially horizontal posture, the truck body can thereafter be lifted straight up or otherwise manipulated as per the detaching mechanisms of the invention.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

For example, the truck bodies may be received on a platform which may be addressed with the body in the unlatched, raised position. Other types of leg supports may be employed in the self-supporting embodiment. Also, the parts of the securing mechanism may be located anywhere on the chassis/container compatible with a particular design. The number, location and drive means for operating the eccentric cam or cams, for example, may vary. Thus, the cam system may be mounted decidedly forward of the illustrated location; cams may be chain, screw or gear driven. Other variations will occur to those skilled in the art.

I claim:

1. A self-contained system for exchanging a detachable refuse hauling truck body detachably secured to and carried by a vehicle chassis, comprising:

(a) a vehicle chassis having a truck body supporting portion;

(b) a detachable truck body, said truck body including an independent supporting means comprising a plurality of deployable support leg means attached to said truck body for supporting said truck body as a stand alone unit when said truck body is disconnected from said vehicle chassis, said independent supporting means being deployable and retractable when said truck body is in a raised receive and release position relative to said vehicle chassis;

(c) dual function truck body handling means including reversible raisable support means on said chassis for raising and lowering said truck body relative to said chassis thereby facilitating the transfer to and from said independent supporting means operable to position said detachable truck body between a raised receive and release position and a lowered, attaching position, and reversible longitudinal positioning means wherein said raiable support means and said reversible longitudinal positioning means include separate and independent motive means for adjusting the position of the truck body along said vehicle chassis to enable reversible securing of said truck body to said chassis;

(d) truck body attaching means for securing the truck body to the chassis; and (e) mechanized means on said vehicle chassis for operating said truck body handling means.

2. The apparatus of claim 1 further comprising means for tilting said detachable refuse hauling truck body on said vehicle chassis for emptying refuse therefrom.

3. The apparatus of claim 2 wherein said means for tilting said detachable refuse hauling truck body on said vehicle chassis is a telescoping fluid-operated cylinder.

4. The apparatus of claim 1 wherein said attaching means includes at least a first pair of chassis locking means, one associated with each side of said chassis, each capable of interlocking with a corresponding locking means, one associated with each side of a device to be secured to the chassis, said interlocking being reversibly occasioned by the operation of said longitudinal positioning means.

5. The apparatus of claim 1 wherein said handling means includes aligment means for assuring proper positioning of said truck body on said chassis.

6. The apparatus of claim 5 wherein said raisable support means comprises a plurality of vertically disposed fluid operated cylinders.

7. The apparatus of claim 1 wherein said raisable support means comprises a plurality of vertically disposed fluid operated cylinders.

8. The apparatus of claim 1 wherein said truck body attaching means comprises a plurality of offset-mounted eccentric cam means.

9. The apparatus of claim 8 wherein each one of said plurality of eccentric cam means is carried on a separate transverse axis.

10. The apparatus of claim 1 further comprising alignment guide means associated with said vehicle chassis for assuring proper alignment of the truck body on the chassis.

11. A self-contained system for exchanging a detachable refuse hauling truck body detachably secured to and carried by a vehicle chassis, comprising:

(a) a vehicle chassis having a truck body supporting portion;

(b) a detachable truck body, said truck body including an independent supporting means comprising a plurality of deployable support leg means attached to said truck body for supporting said truck body as a stand alone unit when said truck body is disconnected from said vehicle chassis, said independent supporting means being deployable and retractable when said truck body is in a raised receive and release position relative to said vehicle chassis;

(c) dual function truck body handling means including reversible raisable support means on said chassis for raising and lowering said truck body relative to said chassis thereby facilitating the transfer to and from said independent supporting means operable to position said detachable truck body between a raised receive and release position and a lowered, attaching position, and reversible longitudinal positioning means for adjusting the position of the truck body along said vehicle chassis to enable reversible securing of said truck body to said chassis;

(d) truck body attaching means for securing the truck body to the chassis; and (e) mechanized means on said vehicle chassis for operating said truck body handling means; and (f) wherein said attaching means includes at least a first pair of chassis locking means, one associated with each side of said chassis, each capable of interlocking with a corresponding locking means, one associated with each side of a device to be secured to the chassis, said interlocking being reversibly occasioned by the operation of said longitudinal positioning means, said chassis locking means comprising an over-center linkage arrangement.

12. A self-contained system for exchanging a detachable refuse hauling truck body detachably secured to and carried by a vehicle chassis, comprising:

(a) a vehicle chassis having a truck body supporting portion;

(b) a detachable truck body, said truck body including an independent supporting means comprising a plurality of deployable support leg means attached to said truck body for supporting said truck body as a stand alone unit when said truck body is disconnected from said vehicle chassis, said independent supporting means being deployable and retractable when said truck body is in a raised receive and release position relative to said vehicle chassis;

(c) dual function truck body handling means including reversible raisable support means on said chassis for raising and lowering said truck body relative to said chassis thereby facilitating the transfer to and from said independent supporting means operable to position said detachable truck body between a raised receive and release position and a lowered, attaching position, and reversible longitudinal positioning means for adjusting the position of the truck body along said vehicle chassis to enable reversible securing of said truck body to said chassis;

(d) truck body attaching means for securing the truck body to the chassis; and (e) mechanized means on said vehicle chassis for operating said truck body handling means; and (f) wherein said truck body attaching means comprises a plurality of eccentric cam means, and further comprising a pair of chassis locking means mounted on said vehicle chassis and a pair of truck body locking means, one fixed to either side of said truck body to be secured to the chassis, said pair of chassis locking means being capable of interlocking with said pair of truck body locking means, said interlocking being reversibly occasioned by the rotation of the eccentric cam means.

13. The apparatus of claim 12 wherein the chassis locking means and said truck body locking means comprise aligned interlocking, mating hook means.

14. The apparatus of claim 12 wherein said longitudinal positioning means comprises at least one double-acting hydraulic cylinder and the truck body attaching means comprises an over-center linkage attached between at least one of said at least one double-acting hydraulic cylinders and one of said plurality of said cam means.

15. The apparatus of claim 14 wherein said plurality of deployable support leg means includes a plurality of support legs pivotally mounted to said truck body for stowage and pivotally deployment therefrom.

16. The apparatus of claim 15 wherein each support leg has a leg axis and said leg axis is provided with an offsetting segment such that the entire leg will store horizontally close to the body but extend in a manner which allows it to laterally and transversely clear the truck chassis such that it may be deployed in a substantially vertical position with the truck body raised on said chassis.

17. A self-contained system for exchanging a detachable refuse hauling truck body detachably secured to and carried by a vehicle chassis, comprising:
   (a) a vehicle chassis having a truck body supporting portion;
   (b) a detachable truck body, said truck body including an independent supporting means comprising a plurality of deployable support leg means attached to said truck body for supporting said truck body as a stand alone unit when said truck body is disconnected from said vehicle chassis, said independent supporting means being deployable and retractable when said truck body is in a raised receive and release position relative to said vehicle chassis;
   (c) dual function truck body handling means including reversible raisable support means on said chassis for raising and lowering said truck body relative to said chassis thereby facilitating the transfer to and from said independent supporting means operable to position said detachable truck body between a raised receive and release position and a lowered, attaching position, and reversible longitudinal positioning means for adjusting the position of the truck body along said vehicle chassis to enable reversible securing of said truck body to said chassis;
   (d) truck body attaching means for securing the truck body to the chassis;
   (e) mechanized means on said vehicle chassis for operating said truck body handling means; and
   (f) wherein said truck body attaching means comprises a plurality of eccentric cam means and each eccentric cam means further comprises an open slot means positioned so as to be directed in a generally upward direction when said truck body is in the receive and release position for receiving or releasing a latch bar means fixed to said truck body and wherein rotation of each eccentric cam means about an axis of rotation toward a locked position will cause said latch bar means to be engaged and to move in a generally horizontal direction perpendicular to the axis of rotation of said cam means to a position selected from a locked position and one where locking can take place.

* * * * *